US012163404B2

(12) United States Patent
Fehres

(10) Patent No.: US 12,163,404 B2
(45) Date of Patent: Dec. 10, 2024

(54) WELLSITE MONITORING SYSTEM AND METHOD

(71) Applicant: National Oilwell Varco, L.P., Houston, TX (US)

(72) Inventor: Carl Fehres, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 474 days.

(21) Appl. No.: 17/613,821

(22) PCT Filed: May 22, 2020

(86) PCT No.: PCT/US2020/034130
§ 371 (c)(1),
(2) Date: Nov. 23, 2021

(87) PCT Pub. No.: WO2020/242907
PCT Pub. Date: Dec. 3, 2020

(65) Prior Publication Data
US 2022/0235633 A1  Jul. 28, 2022

Related U.S. Application Data

(60) Provisional application No. 62/852,594, filed on May 24, 2019.

(51) Int. Cl.
*E21B 41/00* (2006.01)
*H04W 12/06* (2021.01)
(Continued)

(52) U.S. Cl.
CPC ............. *E21B 41/00* (2013.01); *H04W 12/06* (2013.01); *H04W 56/0015* (2013.01);
(Continued)

(58) Field of Classification Search
CPC ........ E21B 41/00; E21B 47/00; H04W 12/06; H04W 56/0015; H04W 84/18;
(Continued)

(56) References Cited

U.S. PATENT DOCUMENTS 9,546,545 B2 * 1/2017 Cardellini ............. E21B 47/007
2005/0283347 A1   12/2005 Ovadia
2005/0289347 A1 * 12/2005 Ovadia ................. H04L 9/3247
                                                   713/171
(Continued)

OTHER PUBLICATIONS

International Search Report mailed Aug. 25, 2020 and issued in counterpart International PCT Application No. PCT/US2020/034130.

*Primary Examiner* — Abdullahi Ahmed
(74) *Attorney, Agent, or Firm* — Harris Wilson & Christenson PLLC

(57) ABSTRACT

A wellsite monitoring system includes a base station, a plurality of access points, and a wellsite communication interface. The base station is configured to provide communication between the wellsite and a remote system. Each of the access points is configured to communicate with base station. The wellsite communication interface is interfaced to well service equipment, and is configured to communicate with the access points via a wellsite protocol used by the base station, and to present an authentication credential to the base station. The base station is also configured to verify an identity of the wellsite communication interface via the authentication credential, and to enable communication with the wellsite communication interface based on verification of the identity of the wellsite communication interface.

20 Claims, 4 Drawing Sheets

(51) Int. Cl.
    *H04W 56/00*     (2009.01)
    *G06V 20/52*     (2022.01)
    *H04N 7/18*     (2006.01)
    *H04W 84/18*     (2009.01)
    *H04W 88/08*     (2009.01)

(52) U.S. Cl.
    CPC .............. *G06V 20/52* (2022.01); *H04N 7/183* (2013.01); *H04W 84/18* (2013.01); *H04W 88/08* (2013.01)

(58) Field of Classification Search
    CPC .... H04W 88/08; H04W 12/069; G06V 20/52; H04N 7/183; G06F 21/31; H04Q 9/00; H04Q 2209/40; H04L 43/065
    See application file for complete search history.

(56) References Cited

U.S. PATENT DOCUMENTS

| | | | |
|---|---|---|---|
| 2009/0225630 A1* | 9/2009 | Zheng | G01V 1/42 367/81 |
| 2015/0345281 A1* | 12/2015 | Cardellini | E21B 47/007 340/853.2 |
| 2017/0204705 A1 | 7/2017 | King | |
| 2017/0308816 A1 | 10/2017 | Ioli | |
| 2018/0080306 A1* | 3/2018 | Passolt | G08B 25/00 |
| 2018/0276920 A1 | 9/2018 | Haci et al. | |
| 2019/0078426 A1* | 3/2019 | Zheng | E21B 44/00 |
| 2020/0205209 A1* | 6/2020 | Pan | H04W 4/40 |
| 2020/0296619 A1* | 9/2020 | Pan | H04W 76/14 |
| 2021/0115776 A1* | 4/2021 | Gundersen | E21B 41/00 |
| 2021/0119863 A1* | 4/2021 | Styles | E21B 47/00 |
| 2022/0259947 A1* | 8/2022 | Li | G06V 20/52 |

* cited by examiner

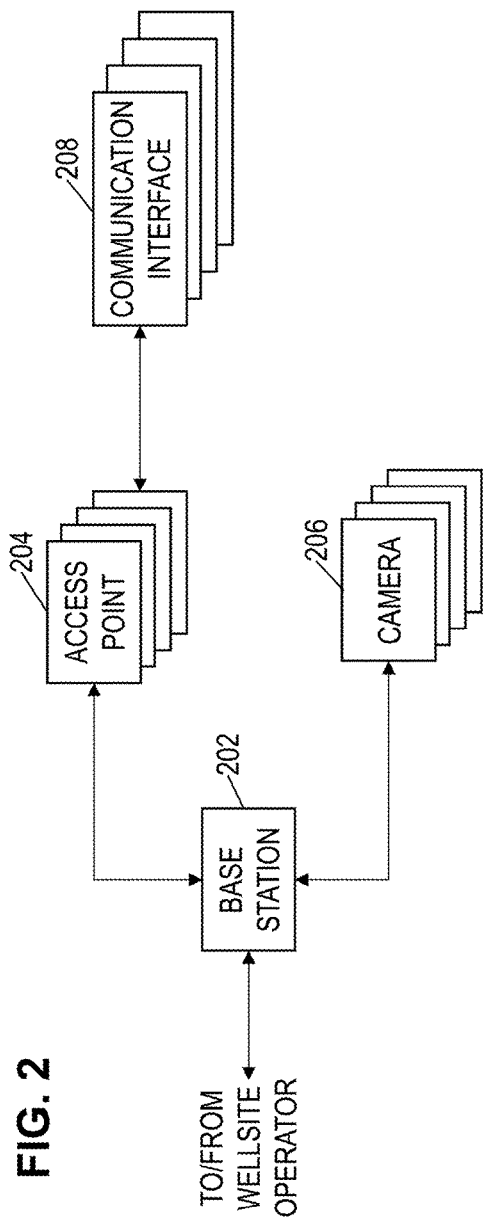
FIG. 2
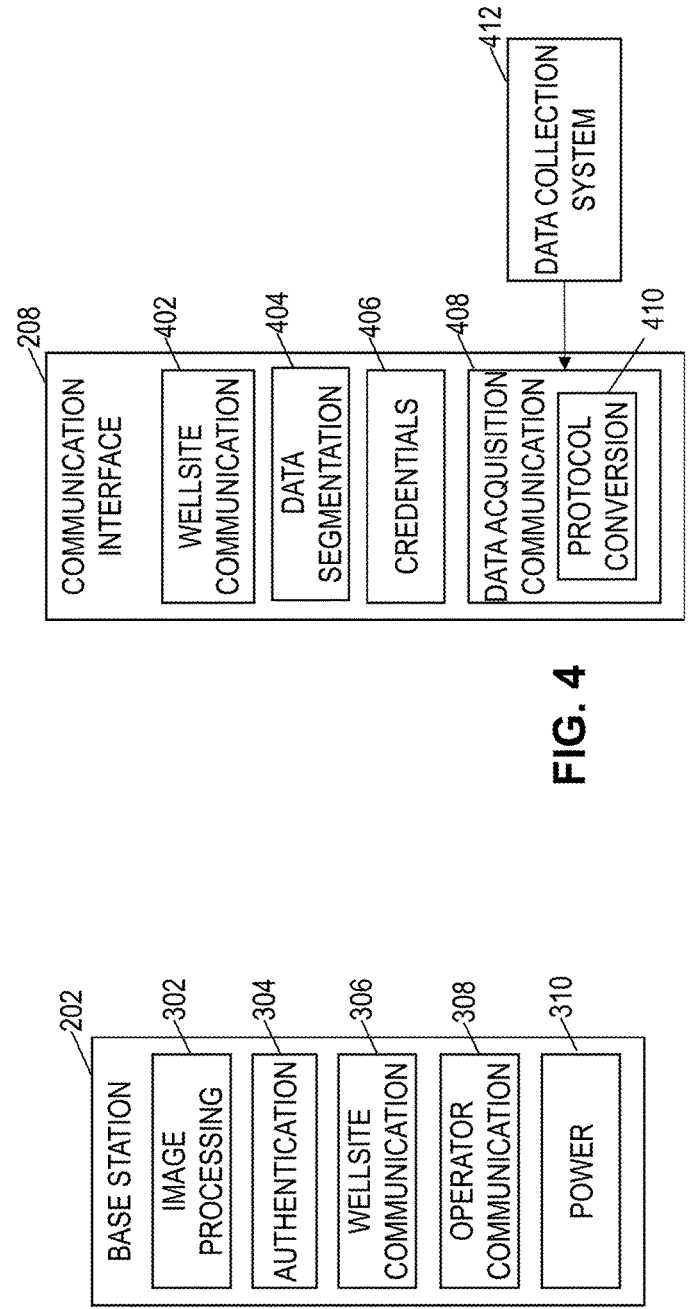
FIG. 3
FIG. 4

WELLSITE MONITORING SYSTEM AND METHOD

CROSS-REFERENCE TO RELATED APPLICATIONS

The present application is a National Phase Entry of PCT International Application No. PCT/US2020/034130 filed May 22, 2020, and claims priority to U.S. Provisional Patent Application No. 62/852,594, filed May 24, 2019, titled "Wellsite Monitoring System and Method," which is hereby incorporated herein by reference in its entirety.

BACKGROUND

The time required to bring a hydrocarbon well into production can vary substantially. For example, the time required to drill a well may vary from less than a month to over a year. After drilling is complete, additional time (e.g., another month or more) is needed to prepare the well for production. The various wellsite activities performed during drilling and completion a well are undertake by employees and/or contractors commissioned by the wellsite operator to execute specific tasks with regard to the well. For example, a wellsite operator may hire a first contractor to construct and operate a drilling rig, a second contractor to cement casing in the wed, a third contractor to provide logging services, etc. The wellsite is generally active 24 hours a day, seven days a week to minimize the time needed to bring a well to production, with each of the various contractors present at the wellsite as needed to perform a specific task.

SUMMARY

A wellsite monitoring system and method are disclosed herein. In one example, a wellsite monitoring system includes a base station, a plurality of access points, and a wellsite communication interface. The base station is configured to provide communication between the wellsite and a remote system. Each of the access points is configured to communicate with base station. The wellsite communication interface is interfaced to well service equipment, and is configured to communicate with the access points via a wellsite protocol used by the base station, and to present an authentication credential to the base station. The base station is also configured to verify an identity of the wellsite communication interface via the authentication credential, and to enable communication with the wellsite communication interface based on verification of the identity of the wellsite communication interface. The wellsite communication interface may be configured to communicate with the base station responsive to detection of transmissions from the access points. The wellsite communication interface may be configured to receive well service information from the well service equipment, to translate well service information received from the well service equipment to the wellsite protocol, and to transmit the well service information to the base station. The wellsite monitoring system may also include a camera coupled to the base station, and configured to capture images of the wellsite. The base station may be configured to identify the well service equipment based on the images captured by the camera, and determine whether the authentication credential is assigned to the well service equipment identified via the images. The wellsite communication interface may be configured to synchronize a clock in the wellsite communication interface to a time value transmitted by the access points, and to add a time stamp, provided by the clock and indicating time of acquisition, to well service information received from the well service equipment. The base station may be configured to time align the well service information with data received from a plurality of well service systems operating at the wellsite based on the time stamp. The access points may be configured to form a mesh network that provides communication within a perimeter of the wellsite. The authentication credential may be a digital certificate. The base station may be configured to authenticate the digital certificate, and to disable communication with the wellsite communication interface responsive to finding the digital certificate to be inauthentic. The base station may be configured to measure efficiency of the well service equipment by measuring a time needed for the well service equipment to perform a task.

In another example, a method for wellsite communication includes detecting, by a wellsite communication interface, transmissions of a wellsite communication network formed at a wellsite. Authentication information is transmitted to a base station of the wellsite communication network by the wellsite communication interface. The authentication information is validated by the base station. Acceptance of the authentication information is transmitted to the wellsite communication interface by the base station. Well service information acquired by well service equipment coupled to the wellsite communication interface is transmitted by the wellsite communication interface. The well service information is received by the base station. The well service information is transmitted, by the base station, to a computing system remote from the wellsite. The method may also include translating, by the wellsite communication interface, the well service information to a wellsite protocol used by the base station, and transmitting the translated well service information to the base station. The method may also include capturing, by a camera coupled to the base station, images of the wellsite, identifying, by the base station, the well service equipment based on the images, and determining, by the base station, whether the authentication information is assigned to the well service equipment identified via the images. The method may also include synchronizing a clock in the wellsite communication interface to a time value transmitted by access points of the wellsite communication network, and adding, by the wellsite communication interface, a time stamp, provided by the clock and indicating time of acquisition, to the well service information received by the wellsite communication interface from the well service equipment. The method may also include time aligning, by the base station, the well service information with data received from a plurality of well service systems operating at the wellsite based on the time stamp. The method may also include measuring, by the base station, efficiency of the well service equipment by measuring, based on the time stamp, a time needed for the well service equipment to perform a task.

In a further example, a non-transitory computer-readable medium is encoded with instructions that when executed cause one or more processors to receive authentication information transmitted by a wellsite communication interface to a base station of a wellsite communication network formed at a wellsite, to validate the authentication information in the base station, and to transmit, from the base station, acceptance of the authentication information to the wellsite communication interface. The instructions also cause the one or more processors to receive, in the base station, well service information acquired by well service equipment coupled to the wellsite communication interface, and transmit, from the base station, the well service information to a computing system remote from the wellsite. The instructions may also cause the one or more processors to receive images of the wellsite captured by a camera at the wellsite, and identify the well service equipment based on the images. The instructions may also cause the one or more processors to determine, by the base station, whether the authentication information is assigned to the well service equipment identified via the images. The instructions may also cause the one or more processors to time align the well service information with data received from a plurality of well service systems operating at the wellsite based on a time stamp included in the well service information. The instructions may also cause the one or more processors to measure efficiency of the well service equipment by measuring, based on the time stamp, a time needed for the well service equipment to perform a task. The instructions may also cause the one or more processors to disable communication with the wellsite communication interface responsive to finding the authentication information to be invalid.

BRIEF DESCRIPTION OF THE DRAWINGS

For a detailed description of various examples, reference will now be made to the accompanying drawings in which:

FIG. 2 shows a block diagram for a wellsite monitoring system in accordance with the present disclosure;

FIG. 3 shows a block diagram for a wellsite base station of a wellsite monitoring system in accordance with the present disclosure;

FIG. 4 shows a block diagram for a wellsite communication interface in accordance with the present disclosure;

DETAILED DESCRIPTION

Figure 1:
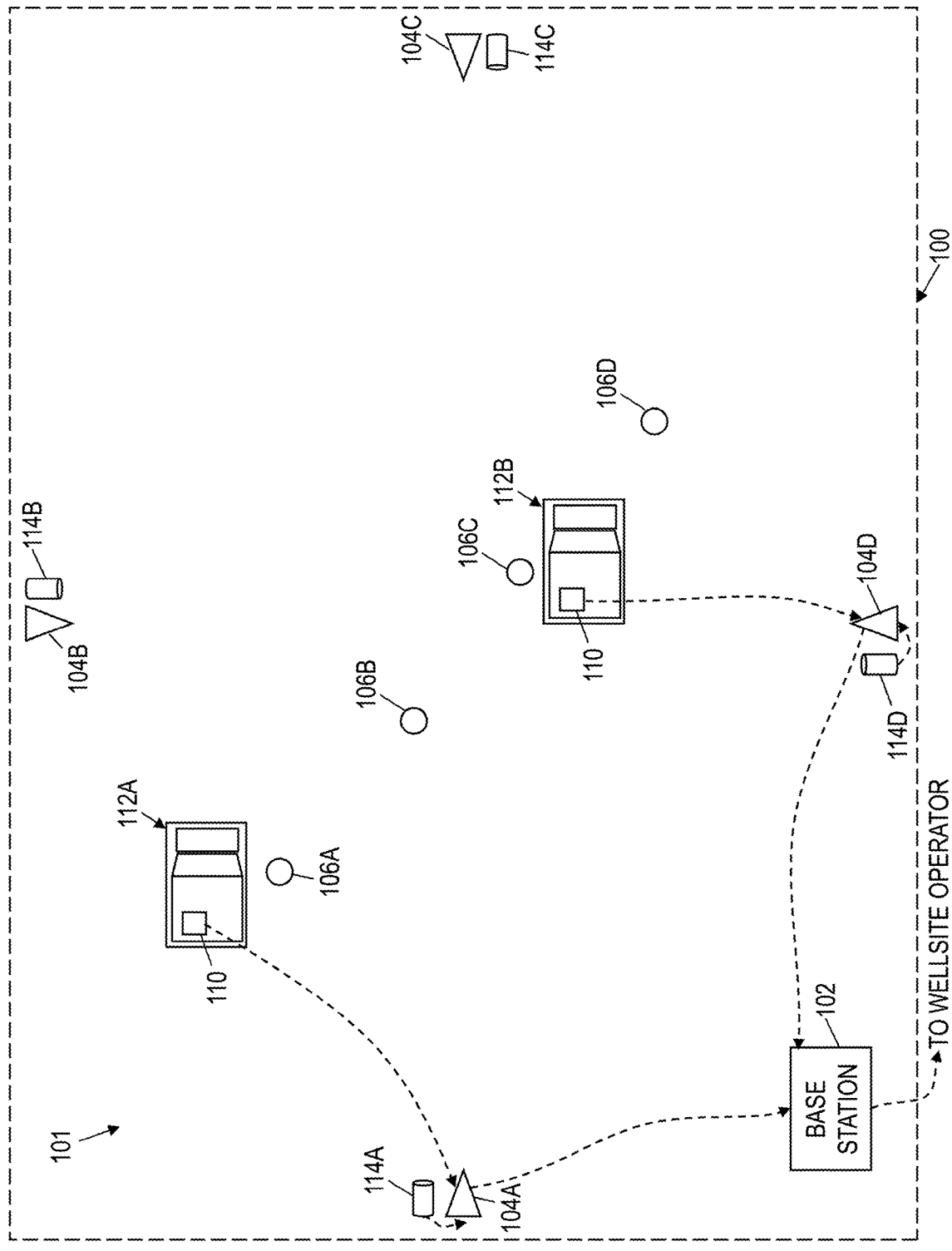
FIG. 1 shows a schematic level diagram of a wellsite that includes a wellsite monitoring system in accordance with the present disclosure.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either a direct or indirect connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The various activities undertaken at a wellsite to drill and complete a well may be performed by any number of different entities commissioned by the wellsite operator. Each activity may generate a substantial quantity of data that can be analyzed by the wellsite operator to determine the condition of the well and the wellsite at a given time. In conventional practice, a contractor collects data pertinent to operations performed by the contractor at the wellsite, identifies a portion of the collected data to be provided to the well site operator (e.g., data the contractor is required to provide by contractual agreement with the wellsite operator), and forwards the identified data to the wellsite operator. The time required for the contractor to analyze and identify the data acquired at the wellsite, and provide the data to the wellsite operator may reduce the value of the data to the wellsite operator. For example, timely presentation of the data acquired by a contractor provides the wellsite operate with a more complete view of wellsite activities, and may allow the wellsite operator to select an appropriate course of action before conditions at the wellsite change.

The wellsite monitoring system of the present disclosure automates the transfer of information from the entities working at the wellsite to the wellsite operator. The system automatically identifies each contractor present at the wellsite, and facilitates the transfer of data acquired by the contractor to the wellsite operator as the data is collected by the contractor, or at an earliest time that the data is available to the contractor. Thus, the wellsite monitoring system ensures the timely transfer of data from the contractor to the wellsite operator.

The wellsite monitoring system disclosed herein includes a wellsite data communication network. The wellsite data communication network may include multiple access points that provide access to a wireless network covering the wellsite. The access points may be arranged to optimize network coverage within the wellsite and reduce access to the network outside a perimeter of the wellsite. The access points are communicatively coupled to a wellsite base station that transfers wellsite data to the wellsite operator.

Each contractor working at the wellsite provides the equipment needed to perform a designated task. The equipment includes data collection systems that acquire data, such as wellsite measurements, associated with the designated task. The acquired data may include hundreds or thousands of different control signals and/or measurement (e.g., sensor output) signals. The equipment also includes a wellsite network interface. The wellsite network interface communicates with the wellsite base station to establish a communication channel between the wellsite base station and the wellsite communication interface included in the contractor's equipment. Establishing a communication channel may include verification of the identity of the wellsite network interface. For example, each wellsite communication interface may include authentication information, such as a digital certificate that uniquely identifies the wellsite network interface as authorized to access the wellsite data communication network. The wellsite base station may grant network access to the wellsite communication interface only if the authentication credentials are verified to be valid. As the contractor performs a designated task at the wellsite, the contractor's data collection system provides the acquired data to the wellsite communication interface, which, in turn, transmits the acquired data to the wellsite base station. The wellsite base station transmits the data received from the contractor's wellsite communication interface to data storage and processing systems managed by the wellsite operator.

To further facilitate identification of entities operating at the wellsite, the wellsite monitoring system may include multiple cameras connected to the wellsite data communication network. Each camera transmits images to the wellsite base station. The wellsite base station may include an image processing system that identifies objects in the received images. In one implementation, the image processing system identifies vehicles and particular markings of the vehicles that indicate which contractor controls the vehicle. For example, a contractor may mark its vehicles with a particular color and or pattern, and may provide alphanumeric identification on the vehicle exterior, which the image processing system may apply to identify the contractor and the particular vehicle. On identification of a particular vehicle, the wellsite base station may confirm that received authentication credentials are assigned to the wellsite communication interface installed in the identified vehicle.

The wellsite monitoring system also facilitates measurement of contractor efficiency by adding context information to the data collected by the contractor. In some implementations, the wellsite operator subdivides the task to be performed by the contractor into a series of sub-tasks. The sub-tasks may be sequentially performed by the contractor to complete the task. As the contractor performs each sub-task, the contractor notifies the wellsite base station of initiation and completion of the sub-task, thereby allowing the wellsite operator to correlate the data received from the contractor with the sub-task performed to generate the data, and to measure the time required to perform each sub-task. With this information, the wellsite operator can determine the efficiency of the contractor in performing the task with respect to different contractors that also perform the task.

FIG. 1 shows a schematic level diagram of a wellsite 100 that includes a wellsite monitoring system 101 in accordance with the present disclosure. The wellsite monitoring system 101 includes a wellsite base station 102, and a number of access points 104A, 1046, 104C, and 104D (also referred to herein individually or collectively as access point(s) 104). The access points 104 may be communicatively coupled to the wellsite base station 102, and to one another, to form a mesh network that provides communication, within the perimeter of the wellsite 100, to and from the wellsite base station 102. While four access points 104 are shown in FIG. 1, the wellsite 100 may include any number of access points 104.

The wellsite 100 also includes wells 106A, 106B, 106C, and 106D (also referred to herein individually or collectively as well(s) 106). While four wells 106 are shown in FIG. 1, the wellsite 100 may include any number of wells 106. At any given time, each of the wells 106 may be at a different life stage. For example, the well 106A is being drilled, the well 106C is undergoing completion, and the well 106D is in production. A wellsite operator (e.g., the lessee of the wellsite 100) engages various entities to drill and to service the wells 106. For example, the wellsite operator engages a first company to drill the well 106A, a second company to log the well 106A, a third company to cement casing in the well 106A, etc.

Each entity engaged in operations with respect to a well 106, provides equipment to perform the desired operations. For example, a company engaged to drill the well 106A provides a drilling rig and associated equipment needed to drill the well 106A. The equipment provided to operate on the wells 106 produces a wide variety of control signals and parameter measurements as operations are performed on the wells 106. In some implementations, the equipment may produce hundreds or thousands of different control signals or parameter measurement signals while performing operations on a well 106. The wellsite monitoring system 101 can transfer the control signals and parameter measurements to the wellsite operator for analysis as the operations are performed.

In FIG. 1, equipment 112A is operating on well 106A and equipment 112B is operating on well 106C. Equipment 112A may be a drilling rig and associated equipment, and equipment 112B may include equipment for logging the well 106C, completing the well 106C, etc. In practice, the equipment 112A and 112B may include any equipment that operates on the well 106A or the well 106C. Equipment 112A and/or equipment 112B may referred to herein (collectively or individually) as equipment 112.

The equipment 112 includes a wellsite communication interface 110. The wellsite communication interface 110 communicates with the wellsite base station 102 via the access points 104. The wellsite communication interface 110 is communicatively coupled to the control and parameter measurement systems of the equipment 112 so that when the equipment 112 is operated, the control and parameter measurement signals generated by the equipment 112 are provided to the wellsite communication interface 110 for transmission to the wellsite base station 102. The equipment 112 provides the control and parameter measurement signals to the wellsite communication interface 110 using any of a variety of communication protocols (e.g., OPC/UA, OPC, PLC, Modbus, CANbus, etc.). The wellsite communication interface 110 receives the control and parameter measurement signals generated by the equipment 112, converts the signals to the protocol expected by the wellsite base station 102, and transmits the signals to the wellsite base station 102. For example, the protocol expected by the wellsite base station 102 may be OPC/UA or a modified version thereof.

The wellsite communication interface 110 transmits the control and parameter measurement signals to the base station 102 when the signals are received from the equipment 112. In some implementations, the equipment 112 provides the signals to the wellsite communication interface 110 as soon as the signals are generated by the equipment 112. However, in some implementations of the equipment 112 the control and parameter measurement signals may be provided to the wellsite communication interface 110 sometime after generation. For example, if the equipment includes a down hole tool that measures conditions of the subsurface environment (e.g., temperature, pressure, etc.) and stores the measurements in a memory of the down hole tool, the measurement signals are not provided to the wellsite communication interface 110 when generated. Rather, when the down hole tool is extracted from the borehole, the measurement signals are read from the memory of the downhole tool and provided to the wellsite communication interface 110 for transmission to the base station 102.

When the equipment 112 is located at the wellsite 100 and powered-on, the equipment 112 detects the transmissions of the access points 104 and communicates with the wellsite base station 102 to connect to the wellsite monitoring system 101. For example, when a vehicle transporting the equipment 112 drives onto the wellsite 100 and the equipment 112 is powered on, the equipment 112 detects the transmission of the access points 104 and attempts to communicate with the wellsite base station 102 and connect to the wellsite monitoring system 101. The wellsite communication interface 110 includes a digital certificate that identifies the wellsite communication interface 110 as authorized to communicate with the wellsite base station 102 and transfer data to the wellsite operator. When the wellsite communication interface 110 detects the transmissions of the access points 104, the wellsite communication interface 110 presents the digital certificate to the wellsite base station 102. The wellsite base station 102 authenticates the digital certificate and establishes a communication channel with the wellsite communication interface 110.

If the wellsite base station 102 is unable to authenticate the digital certificate presented by the wellsite communication interface 110 (e.g., the digital certificate is expired), or the wellsite communication interface 110 presents no digital certificate to the wellsite base station 102, then the wellsite base station 102 does not establish a channel for communication with the wellsite communication interface 110, and the wellsite communication interface 110 is unable to transfer data to the wellsite operator. Performing any operation with respect to a well 106 may be contingent on being enabled to transfer data generated by the operation to the wellsite operator via the wellsite base station 102.

The wellsite monitoring system 101 may also include cameras. FIG. 1 shows camera 114A, camera 114B, camera 114C, and camera 114D (also referred to herein collectively or individually as camera 114). The cameras 114 capture images of the wellsite 100 and the equipment 112 operating on the wellsite 100. The cameras 114 are communicatively coupled to the access points 104 for transferring captured images to the wellsite base station 102. The wellsite base station 102 analyzes the images received from the cameras 114 to identify objects in the images. For example, the wellsite base station 102 may identify the equipment 112A and/or the equipment 112B based on indicia of identity (e.g., alphanumeric markings, pictorial markings, etc.) provided on the equipment. Having used the images received from the cameras 114 to identify equipment on the wellsite 100, the wellsite base station 102 may determine whether the equipment is known to be assigned a digital certificate. Thus, the wellsite base station 102 may apply the images received from the cameras 114 to correlate the equipment on the wellsite 100 with digital certificates received from the wellsite communication interface 110.

The wellsite base station 102 may also be configured to measure the efficiency of the equipment 112, and/or the efficiency of the entity controlling the equipment 112. The wellsite base station 102 may measure the time required for the equipment 112 to perform a task, and/or one or more sub-tasks into which the task is divided. For example, the equipment 112 may transmit an indication of the time at which each sub-task is started and/or completed. The wellsite base station 102 or other system coupled to the wellsite base station 102 and controlled by the wellsite operator may compare the times required by each of multiple entities to complete a task, and thereby determine the relative efficiency of each entity at performing the task.

In addition to transmission to sub-task timing information, the equipment 112 may provide an interface for interpersonal communication between a representative of the wellsite operator (e.g., an expert in the operations being performed at the wellsite) at a remote location and a representative of the entity operating the 112. For example, the equipment 112 may provide a "chat box" on a user interface device that allows communication the wellsite operator's representative. Provision of "real-time" interpersonal communication with wellsite operator's representative allows for the timely resolution of issues that arise at the wellsite 100.

FIG. 2 shows a block diagram for a wellsite monitoring system 200 in accordance with the present disclosure. The wellsite monitoring system 200 is an implementation of the wellsite monitoring system 101. The wellsite monitoring system 200 includes a base station 202, a number of access points 204, and one or more cameras 206. The access points 204 and the cameras 206 are communicatively coupled to the base station 202. The wellsite communication interfaces 208 are communicatively coupled to the base station 202 via the access points 204. The access point 204 is an implementation of the access point 104, the camera 206 is an implementation of a camera 114, and the wellsite communication interface 208 is an implementation of the wellsite communication interface 110.

The access points 204 includes antennas, a wireless transceiver coupled to the antennas, power generation systems coupled to the wireless transceiver, and other systems and circuitry for transferring data between the base station 202 and the cameras 206 or the wellsite communication interfaces 208. The cameras 206 includes an image sensor and transceiver circuitry to communicate images captured by the image sensor to the access points 204.

FIG. 3 shows a block diagram for an example of the base station 202. The base station 202 includes authentication circuitry 304, wellsite communication circuitry 306, wellsite operator communication circuitry 308, and power system 310. The power system 310 includes an electrical generator, batteries, solar cells, and/or other circuitry and sub-systems capable of generating power for continuously operating the base station 202. The wellsite operator communication circuitry 308 includes a transceiver for transmitting wellsite data to a remote computer system controlled by the wellsite operator and for receiving transmissions from the remote system. For example, the wellsite operator communication circuitry 308 may include a satellite data transceiver, a long-term evolution (LTE) transceiver, a high-bandwidth wireline transceiver, or other data transceiver capable of high-bandwidth transfer of data between the base station 202 and the remote computer system controlled by the wellsite operator.

The wellsite communication circuitry 306 includes a transceiver for communicating with the access points 204. For example, the wellsite communication circuitry 306 may include a wireless network transceiver (e.g., an IEEE 802.11 compliant transceiver) or a wired network transceiver (e.g., an IEEE 802.3 compliant transceiver) for communicating with the access points 204.

The authentication circuitry 304 includes circuitry that authorizes communication between the base station 202 and the wellsite communication interfaces 208. For example, the authentication circuitry 304 determines whether a digital certificate received from a wellsite communication interfaces 208 is valid. In some implementations, the authentication circuitry 304 may communicate, via the wellsite operator communication circuitry 308, a digital certificate received from a wellsite communication interfaces 208 to a certificate authorization server that verifies the certificate is issued and signed by a trusted certificate authority, verifies that the certificate is not expired, verifies that the certificate has not been revoked, and/or verifies proof of certificate possession. If the certificate authorization server verifies the digital certificate, then the base station 202 enables communication between the wellsite communication interfaces 208 and the base station 202. That is, if the digital certificate is verified, then the base station 202 allows the wellsite communication interfaces 208 to join the wellsite monitoring system 101 and transfer data collected while operating at the wellsite 100 to the base station 202. If the digital certificate is not verified, then the base station 202 may deny the wellsite communication interfaces 208 access to the wellsite monitoring system 101, and the equipment 112 may be unable to operate on the wellsite monitoring system 101.

Implementations of the base station 202 may also include the image processing circuitry 302. The image processing circuitry 302 processes the images received from the cameras 206 to identify objects and equipment at the wellsite monitoring system 101. The image processing circuitry 302 may include segmentation and classification circuitry based on convolutional neural networks or other visual imagery analysis technology. In some implementations of the wellsite monitoring system 101, the image processing circuitry 302 may be provided at a location remote from the base station 202, and coupled to the base station 202 via the wellsite operator communication circuitry 308.

Because weather conditions affect operations at the wellsite 100, some implementations of the 202 may also include weather monitoring equipment to measure weather conditions at the wellsite 100. The 202 may transmit weather measurements to the remote computing system of the wellsite operator in conjunction with the control and measurement signals generated at the wellsite 100. The weather monitoring equipment may measure wind speed, wind direction, temperature, humidity, rainfall, and/or other weather conditions, and provide the weather measurements to the wellsite operator communication circuitry 308 for transmission.

FIG. 4 shows a block diagram for an example of the wellsite communication interfaces 208. The wellsite communication interfaces 208 includes wellsite communication circuitry 402, data segmentation circuitry 404, credentials 406, and data acquisition communication circuitry 408. The data acquisition communication circuitry 408 includes circuitry that interfaces with a data collection system 410 of the equipment 112. For example, the data acquisition communication circuitry 408 includes a receiver compliant with the protocol and electrical interface specifications of the data collection system 412 to receive the data collected by the data collection system 412 while operating at the wellsite 100.

The data acquisition communication circuitry 408 includes protocol conversion circuitry 410. The protocol conversion circuitry 410 converts the data received from the data collection system 412 to the protocol used to communicate with the base station 202. For example, the data collection system 412 uses a protocol such as OPC/UA, OPC, PLC, Modbus, CANbus, or other protocol to communicate data collected during operation of the equipment 112 to the wellsite communication interface 208. Data transfer to the base station 202 uses a different protocol, such as OPC/UA or a modified version thereof. The protocol conversion circuitry 410 includes circuitry to convert from OPC/UA, OPC, PLC, Modbus, CANbus, or other protocol used by the data collection system 412 to the protocol used to communicate with the base station 202.

The wellsite communication circuitry 402 includes a transceiver for communicating with the access points 204. For example, the wellsite communication circuitry 306 may include a wireless network transceiver (e.g., an IEEE 802.11 compliant transceiver) or a wired network transceiver (e.g., an IEEE 802.3 compliant transceiver) for communicating with the access points 204.

The credentials 406 include the digital certificate assigned to the wellsite communication interfaces 208 by a trusted certificate authority. In some implementations, a single trusted certificate authority manages distribution of digital certificates to all instances of the wellsite communication interface 208. The credentials 406 are transmitted to the base station 202 to verify that the wellsite communication interface 208 is authorized to join the wellsite monitoring system 101. The base station 202 allows the wellsite communication interfaces 208 to join the wellsite monitoring system 101 if the credentials 406 are valid. The credentials 406 should be validated prior to the equipment 112 performing any operations with respect to a well 106.

The data segmentation circuitry 404 routes the data received from the data collection system 412 to a selected destination. For example, while operating on a well 106, the equipment 112 may generate N control or measurement signals and transfer a first portion of the data received from the data collection system 412 (e.g., a first set of the signals (M of the N signals)) to the base station 202 via the wellsite monitoring system 101, and transfer a second portion of the data received from the data collection system 412 (e.g., a second set of signals (N-M of the N signals)) to the external and/or remote computer system controlled by the entity operating the equipment 112. In some implementations, the equipment 112 includes a transceiver, such as a satellite transceiver, for transferring the second set of signals to the external system controlled by the entity operating the equipment 112. Identification (a listing) of the particular signals to be transferred to a destination may be determined prior to operation of the equipment 112 at the wellsite 100, and stored in the data segmentation circuitry 404 for use in routing the signals when the equipment 112 is operating at the wellsite 100.

Figure 5:
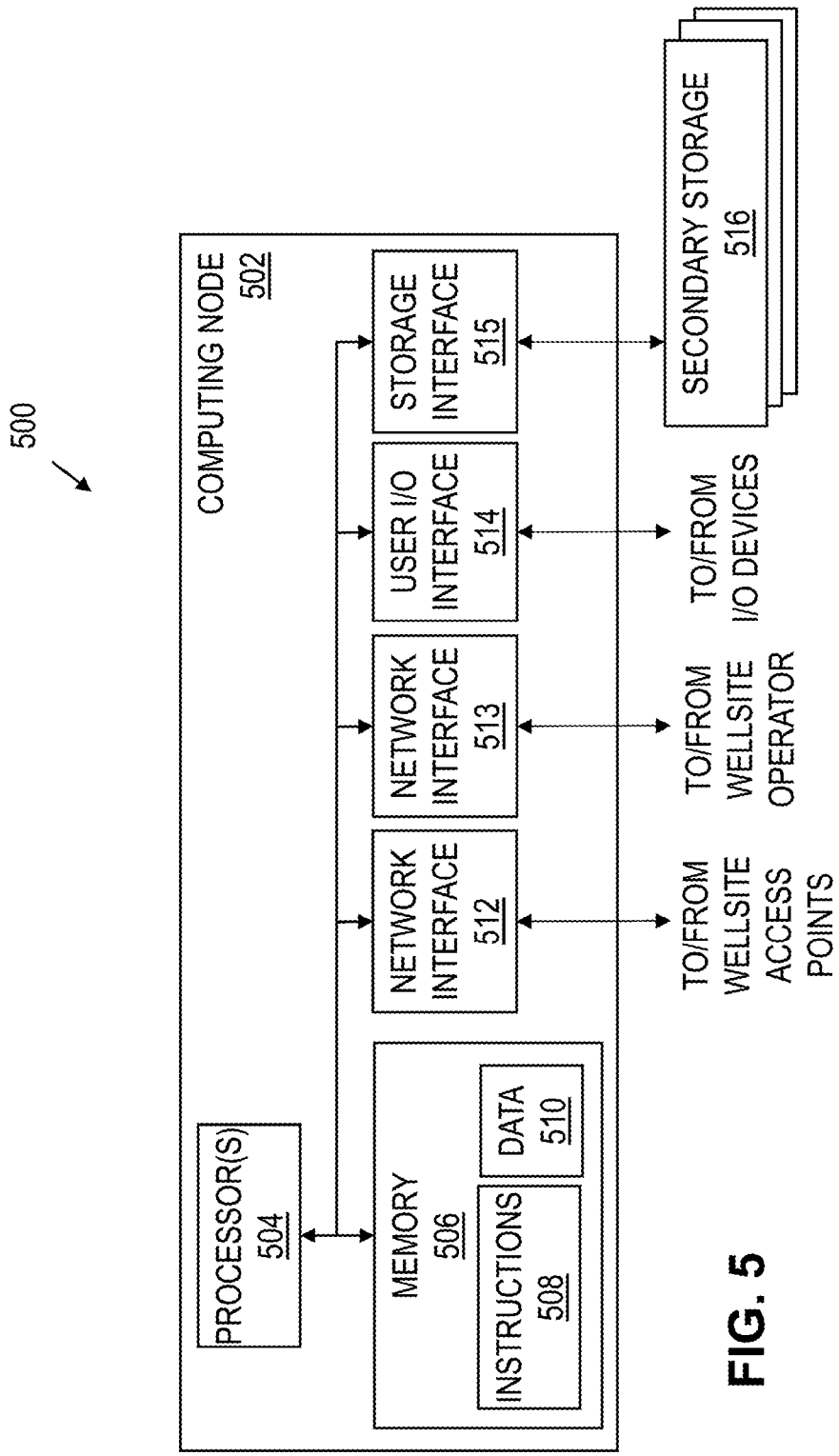
FIG. 5 shows a block diagram for a computing node suitable for use in a wellsite monitoring system in accordance with the present disclosure.

FIG. 5 shows a block diagram for a computing system 500 suitable for use in the wellsite monitoring system 101. Examples of the computing system 500 may be applied to implement the base station 202, the access points 204, and/or the wellsite communication interfaces 208 in implementations of the wellsite monitoring system 101. The computing system 500 includes one or more computing nodes 502 and secondary storage 516 that are communicatively coupled (e.g., via the storage interface 515). One or more of the computing nodes 502 and associated secondary storage 516 may be applied to provide the functionality of each of the base station 202, the access point 204, and/or the wellsite communication interface 208 described herein.

Each computing node 502 includes one or more processors 504 coupled to memory 506, network interface 512, and user I/O interface 514. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures (ISAs), such as the x86, PowerPC, SPARC, or MIPS ISAs, or any other suitable ISA. In multiprocessor systems, each of the processors 504 may commonly, but not necessarily, implement the same ISA.

The memory 506 may include a non-transitory, computer-readable storage medium configured to store program instructions 508 and/or data 510 accessible by processor(s) 504. The memory 506 may be implemented using any suitable memory technology, such as static random-access memory (SRAM), synchronous dynamic RAM (SDRAM), nonvolatile/Flash-type memory, or any other type of memory. Program instructions 508 and data 502 implementing the functionality disclosed herein are stored within memory 506. For example, instructions 508 may include instructions that when executed by processor(s) 504 implement the base station 202, the access point 204, or the wellsite communication interface 208 disclosed herein.

Secondary storage 516 may include volatile or nonvolatile storage and storage devices for storing information such as program instructions and/or data as described herein for implementing the base station 202, the access point 204, or the wellsite communication interface 208. The secondary storage 516 may include various types of computer-readable media accessible by the computing node 502 via the storage interface 515. A computer-readable medium may include storage media or memory media such as semiconductor storage, magnetic or optical media, e.g., disk or CD/DVD-ROM, or other storage technologies.

The network interface 512 includes circuitry configured to allow data to be exchanged between computing node 502 and/or other devices coupled to the wellsite monitoring system 101 (such as other computer systems, communication devices, input/output devices, or external storage devices). For example, the network interface 512 may be configured to allow data to be exchanged between a first instance of the computing system 500 configured to operate as the wellsite communication interface 208 and a second instance of the computing system 500 configured to operate as the access point 204. Similarly, the network interface 512 may be configured to allow data to be exchanged between a first instance of the computing system 500 configured to operate as the base station 202 and a second instance of the computing system 500 configured to operate as the access point 204. The network interface 512 may support communication via wired or wireless data networks.

The computing node 502 may also include a network interface 513 that allows the computing node 502 to exchange data with devices coupled to a network external to the wellsite monitoring system 101. For example, the network interface 513 may be configured to allow data to be exchanged between an instance of the computing system 500 configured to operate as the base station 202 and a remote computing system controlled by the wellsite operator.

The user I/O interface 514 allows the computing node 502 to communicate with various input/output devices such as one or more display terminals, keyboards, keypads, touchpads, scanning devices, voice or optical recognition devices, or any other devices suitable for entering or retrieving data by one or more computing nodes 502. Multiple input/output devices may be present in a computing system 500.

Those skilled in the art will appreciate that the computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Figure 6:
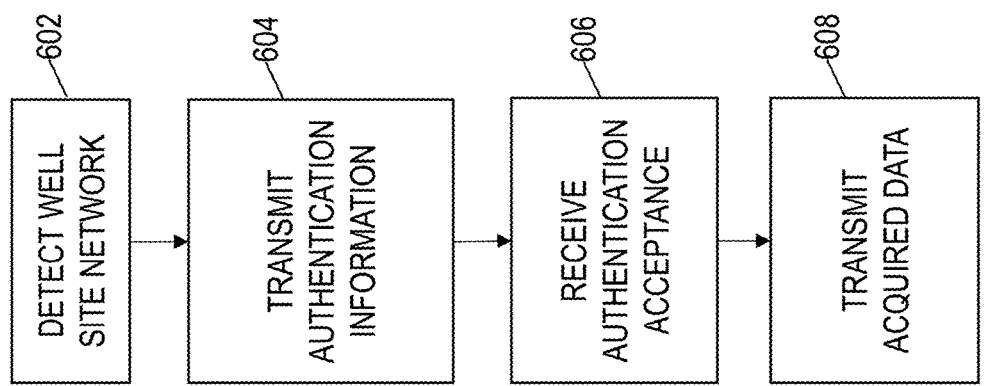
FIG. 6 shows a flow diagram for a method for operating a wellsite communication interface in accordance with the present disclosure.

FIG. 6 shows a flow diagram for a method 600 for operating a wellsite communication interface 208 in accordance with the present disclosure. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by an instance of the computing system 500 implementing the wellsite communication interface 208.

In block 602, the wellsite communication interface 208 is located at the wellsite 100 and powered on. The wellsite communication interface 208 scans for and detects transmissions of the access points 204 indicating that the wellsite monitoring system 101 is active.

In block 604, the wellsite communication interface 208 transmits authentication information to the base station 202. Transmission of authentication information includes transmission of the digital certificate assigned to the wellsite communication interface 208 by a trusted certificate authority for controlling access to the wellsite monitoring system 101.

In block 606, the wellsite communication interface 208 receives, from the base station 202, acceptance of the authentication. That is, the wellsite communication interface 208 receives, from the base station 202, confirmation of the digital certificate's validity. The wellsite communication interface 208 joins the wellsite monitoring system 101 and is allowed to transmit, to the base station 202, data acquired by the equipment 112 while operating on a well 106.

In block 608, the equipment 112 is operating on a well 106 and generating control and measurement signals related to the operations being performed on the well 106. The control and measurement signals are provided to the wellsite communication interface 208 using a first protocol. The base station 202 receives data using a second protocol that is different from the first protocol. The wellsite communication interface 208 converts the control and measurement signals to the second protocol, and using the second protocol transmits the control and measurement signals to the base station 202 via the access points 204.

The wellsite communication interface 208 timestamps the control and measurement signals transmitted to the base station 202. The timestamps may be derived from time values received via the wellsite monitoring system 101. For example, the access points 204 may transmit beacon signals that include a time value. The wellsite communication interface 208 may synchronize an internal clock to the time values received from the access points 204 and timestamp the control and measurement signals transmitted to the base station 202 using time values provided by the internal clock. The base station 202, or other system that receives control and measurement signals produced at the wellsite 100, can time align the signals received from multiple wellsite communication interfaces 208 using the timestamps.

Figure 7:
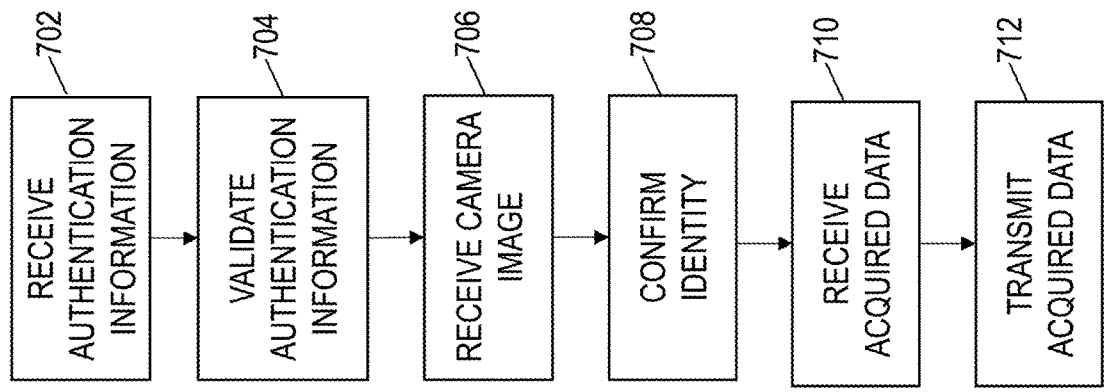
FIG. 7 shows a flow diagram for a method for operating a wellsite base station of a wellsite monitoring system in accordance with the present disclosure.

FIG. 7 shows a flow diagram for a method 700 for operating a wellsite base station 202 of a wellsite monitoring system 101 in accordance with the present disclosure. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by a computing system 500 implementing the base station 202.

In block 702, the base station 202 is installed at the wellsite 100 and is communicating with the access points 204. The base station 202 receives the authentication information (e.g., the digital certificate) transmitted by the wellsite communication interfaces 208.

In 704, the base station 202 validates the authentication information received from the wellsite communication interfaces 208. The validation may be performed by the base station 202, or the base station 202 may transmit the authentication information to another system for validation. For example, the base station 202 may transmit the authentication information to a certificate authorization server for validation. Validation may include verifying that the certificate is issued and signed by a trusted certificate authority, verifying that the certificate is not expired, verifying that the certificate has not been revoked, and/or verifying proof of certificate possession.

In block 706, in some implementations of the method 700, the base station 202 receives images captured by the cameras 206. The base station 202 processes the images to identify objects at the wellsite 100. For example, in an image, the base station 202 may identify the equipment 112 at the wellsite 100, where the equipment 112 includes the wellsite communication interface 208 that transmitted the authentication information received in block 702.

In block 708, the base station 202 confirms the identity of the wellsite communication interface 208 based on the authentication information received in block 702, and in some implementations, based on the images received in block 706. The base station 202 transmits confirmation information to the wellsite communication interface 208 that allows the wellsite communication interfaces 208 to join the wellsite monitoring system 101.

In block 710, the base station 202 receives the control and measurement signals, and any other data, transmitted to the base station 202 by the wellsite communication interfaces 208 via the wellsite monitoring system 101.

In block 712, the base station 202 transmits the control and measurement signals, and other information received form the equipment 112 via the wellsite monitoring system 101, to an external computing system controlled by the wellsite operator for storage and further analysis. For example, the base station 202 transmits the data via a satellite transceiver or an LTE transceiver to the wellsite operator's remote computing system.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wellsite monitoring system, comprising:
a base station configured to provide communication between a wellsite and a remote system;
a plurality of access points, each of the access points configured to communicate with the base station;
a wellsite communication interface interfaced to well service equipment, and configured to:
communicate with the access points via a wellsite protocol used by the base station; and
present an authentication credential to the base station;
wherein the base station is configured to:
verify an identity of the wellsite communication interface via the authentication credential; and
enable communication with the wellsite communication interface based on verification of the identity of the wellsite communication interface.

2. The wellsite monitoring system of claim 1, wherein the wellsite communication interface is configured to communicate with the base station responsive to detection of transmissions from the access points.

3. The wellsite monitoring system of claim 1, wherein the wellsite communication interface is configured to:
receive well service information from the well service equipment;
translate well service information received from the well service equipment to the wellsite protocol; and
transmit the well service information to the base station.

4. The wellsite monitoring system of claim 1, further comprising a camera coupled to the base station, and configured to capture images of the wellsite; wherein the base station is configured to:
identify the well service equipment based on the images captured by the camera; and
determine whether the authentication credential is assigned to the well service equipment identified via the images.

5. The wellsite monitoring system of claim 1, wherein:
the wellsite communication interface is configured to:
synchronize a clock in the wellsite communication interface to a time value transmitted by the access points; and
add a time stamp, provided by the clock and indicating time of acquisition, to well service information received from the well service equipment; and
the base station is configured to time align the well service information with data received from a plurality of well service systems operating at the wellsite based on the time stamp.

6. The wellsite monitoring system of claim 1, wherein the access points are configured to form a mesh network that provides communication within a perimeter of the wellsite.

7. The wellsite monitoring system of claim 1, wherein:
the authentication credential is a digital certificate; and
the base station is configured to:
authenticate the digital certificate; and
disable access to a wellsite communication network by the wellsite communication interface responsive to finding the digital certificate to be invalid.

8. The wellsite monitoring system of claim 1, wherein the base station is configured to measure efficiency of the well service equipment by measuring a time needed for the well service equipment to perform a task.

9. A method for wellsite communication, comprising:
detecting, by a wellsite communication interface, transmissions of a wellsite communication network formed at a wellsite;

transmitting, by the wellsite communication interface, authentication information to a base station of the wellsite communication network;
validating, by the base station, the authentication information;
transmitting, by the base station, acceptance of the authentication information to the wellsite communication interface;
transmitting, by the wellsite communication interface, well service information acquired by well service equipment coupled to the wellsite communication interface;
receiving, by the base station, the well service information, and
transmitting, by the base station, the well service information to a computing system remote from the wellsite.

10. The method of claim 9, further comprising:
translating, by the wellsite communication interface, the well service information to a wellsite protocol used by the base station; and
transmitting the translated well service information to the base station.

11. The method of claim 9, further comprising:
capturing, by a camera coupled to the base station, images of the wellsite;
identifying, by the base station, the well service equipment based on the images; and
determining, by the base station, whether the authentication information is assigned to the well service equipment identified via the images.

12. The method of claim 9, further comprising:
synchronizing a clock in the wellsite communication interface to a time value transmitted by access points of the wellsite communication network; and
adding, by the wellsite communication interface, a time stamp, provided by the clock and indicating time of acquisition, to the well service information received by the wellsite communication interface from the well service equipment.

13. The method of claim 12, further comprising time aligning, by the base station, the well service information with data received from a plurality of well service systems operating at the wellsite based on the time stamp.

14. The method of claim 12, further comprising measuring, by the base station, efficiency of the well service equipment by measuring, based on the time stamp, a time needed for the well service equipment to perform a task.

15. A non-transitory computer-readable medium encoded with instructions that when executed cause one or more processors to:
receive authentication information transmitted by a wellsite communication interface to a base station of a wellsite communication network formed at a wellsite;
validate the authentication information in the base station;
transmit, from the base station, acceptance of the authentication information to the wellsite communication interface;
receive, in the base station, well service information acquired by well service equipment coupled to the wellsite communication interface; and
transmit, from the base station, the well service information to a computing system remote from the wellsite.

16. The non-transitory computer-readable medium of claim 15, wherein the instructions cause the one or more processors to:
receive images of the wellsite captured by a camera at the wellsite; and
identify the well service equipment based on the images.

17. The non-transitory computer-readable medium of claim 16, wherein the instructions cause the one or more processors to determine, in the base station, whether the authentication information is assigned to the well service equipment identified via the images.

18. The non-transitory computer-readable medium of claim 15, wherein the instructions cause the one or more processors to time align the well service information with data received from a plurality of well service systems operating at the wellsite based on a time stamp included in the well service information.

19. The non-transitory computer-readable medium of claim 18, wherein the instructions cause the one or more processors to measure efficiency of the well service equipment by measuring, based on the time stamp, a time needed for the well service equipment to perform a task.

20. The non-transitory computer-readable medium of claim 15, wherein the instructions cause the one or more processors to disable access to the wellsite communication network by the wellsite communication interface responsive to finding the authentication information to be invalid.

* * * * *